United States Patent [19]

Spendlow, Sr. et al.

[11] 4,353,524
[45] Oct. 12, 1982

[54] FLUID CONTROL GATE

[75] Inventors: Harry C. Spendlow, Sr., Erie; William E. Houghton, Littleton, both of Colo.

[73] Assignee: Agri-Flex, Inc., Wheat Ridge, Colo.

[21] Appl. No.: 103,290

[22] Filed: Dec. 13, 1979

[51] Int. Cl.³ .................................................. F16K 3/10
[52] U.S. Cl. .................................... 251/145; 251/300; 137/318; 405/51
[58] Field of Search ................ 137/318; 285/200; 405/43, 51; 251/145, 300

[56] References Cited

U.S. PATENT DOCUMENTS 3,321,175  5/1967  Epp ........................................ 251/145
3,457,945  7/1969  Martin ............................. 285/200 X
4,128,107  12/1978  Blumhardt ..................... 251/145 X Primary Examiner—William R. Cline
Attorney, Agent, or Firm—Robert C. Dorr

[57] ABSTRACT

An improved fluid control gate for selective insertion through a wall such as a flexible irrigation tube to a pressurized fluid medium such as water under gravity feed. The fluid control gate having a hollow extender mounted through and to the wall for the fluid to flow therethrough, a mating nut for engaging the area of the wall around the extender to the circumference of the extender in order to form a fluid seal therebetween, a formed passageway through the mating nut, and a triangular shaped pivotal plate for selectively reducing the flow of the fluid through the hollow passageway.

8 Claims, 23 Drawing Figures

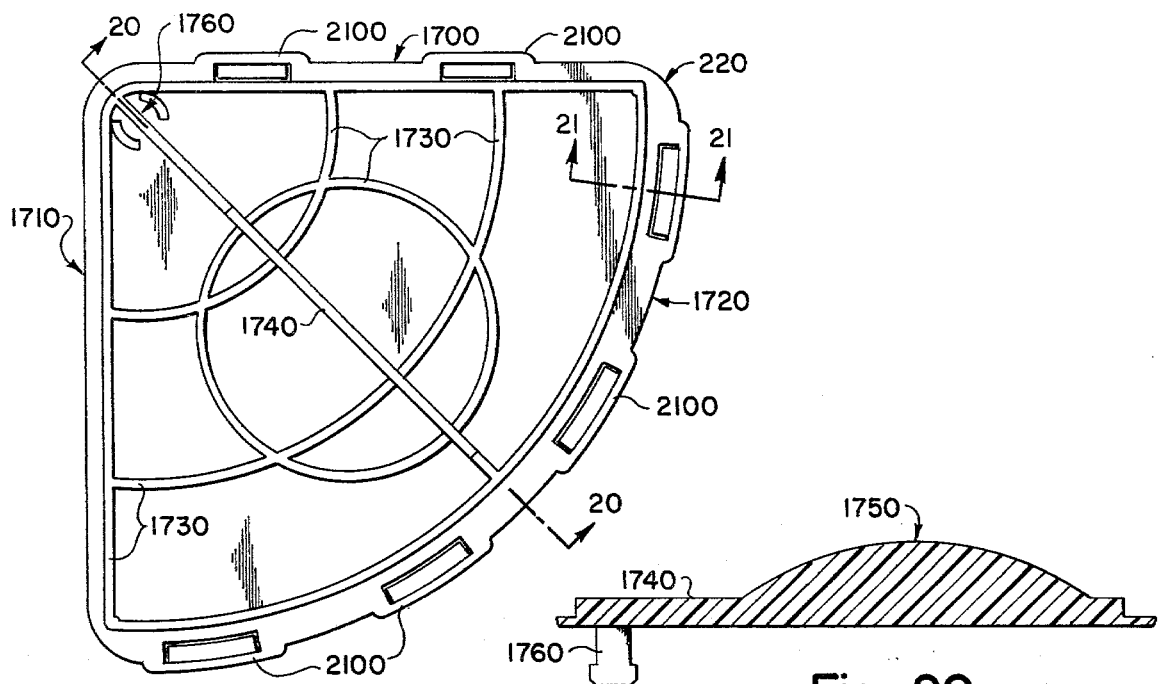
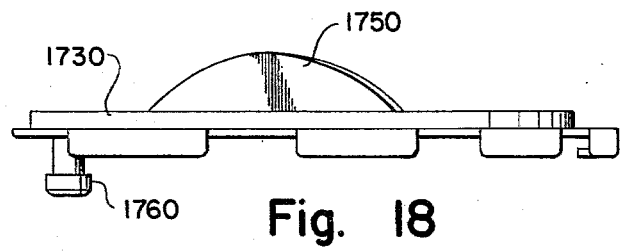
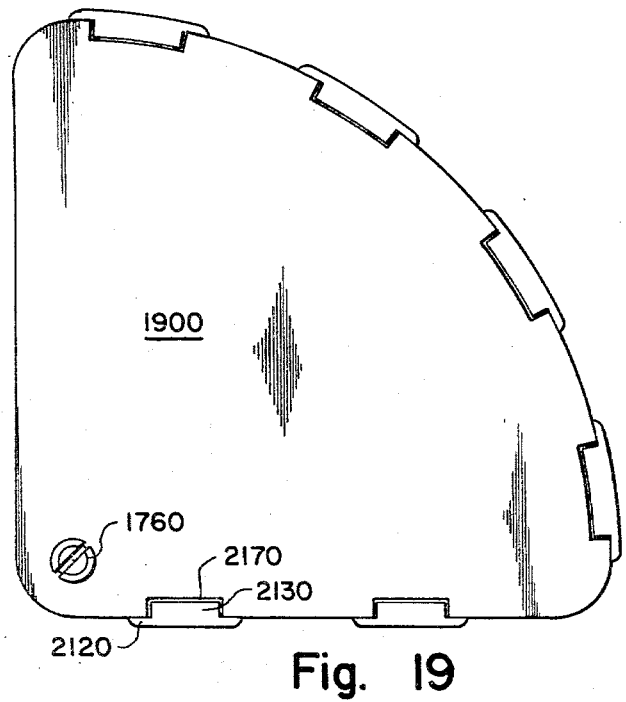

FLUID CONTROL GATE

DISCUSSION OF THE PRIOR ART

1. Field of the Invention

This invention relates to the field of fluid control gates and more specifically to fluid control gates for irrigation systems.

2. Background of the Invention

Numerous conventional fluid valves and gates have been utilized in the past for irrigation pipe and the like. Almost all of these prior art approaches are for rigid piping such as aluminum pipe.

Recently, the use of flexible gravity irrigators made from plastic tubing has occurred. The Blumhardt Manufacturing Company of Ashley, N. Dak., manufactures and sells a fluid control gate of the type set forth in FIG. 1. The flexible tube 10 carries a pressurized fluid 30 in the direction of arrow 30. The flexible tube 10 defines a wall 40 between the outside environment 50 and the pressurized fluid 30. The Blumhardt fluid control gate generally designated 100 provides a formed passageway 110 for fluid 20 to flow through in the direction of arrow 120. A mating nut 130 engages threads on an extender portion 140 to provide a fluid seal with the portion of the wall 40 near the extender 140. Finally, a valve plate 150 can be moved in the direction of arrow 160 to selectively reduce the effective opening of passageway 120 thereby reducing the flow of fluid therethrough. In the operation, the gravity fed flexible tubing 10 is rolled out into a field and the fluid control valve 100 is selectively inserted at desired locations.

Although the Blumhardt fluid control valve has been used since July, 1977, several inherent disadvantages to the valve have arisen. First, the fluid seal between the nut 130 and the wall 40, after use, commences to leak and may actually cause the entire valve to "pop out." In that event, the tubing 10 must be repaired and the valve 100 reinserted into the tube. When this occurs, the fluid flowing through the tube must be stopped resulting in loss of irrigation time as well as increased labor costs.

Furthermore, the valve plate 150 of the Blumhardt valve can be inadvertently removed from the remainder of the valve as it comprises a completely separate component. The plate 150 is difficult to operate in that there is no convenient means of gripping the plate 150 and even when gripped, the plate 150 must be uniformly pushed on opposing vertical sides in order to have the plate 150 slide down the remainder of the valve in the direction of arrow 160. In fact, as the valve is being adjusted to reduce the waterflow, a risk occurs that the valve will disengage from the flexible pipe.

Another disadvantage relates to the method of insertion. Blumhardt provides a channel on the interior of the nut 130 which engages an insertion tool (not shown). After repeated use the channel can crack. Also in operating the plate 150, the lower portion of the outlet hole can be damaged in that the sealing lip can be broken at the lowest edge. Also, the Blumhardt gate, when fully closed, has no provision for restraining the top and bottom edges and the possibility of water leakage through these edges exists. Finally, the plate 150 of Blumhardt generally extends above the upper surface of the tube in operation. In this orientation the plate can be struck (accidentally) or collect blowing debris, etc.

As will become apparent in the following specification, the fluid control gate results in an improvement over the Blumhardt fluid control gate in that it substantially solves the above deficiencies.

SUMMARY OF THE INVENTION

The present invention is an improvement to a fluid control gate wherein the improvement relates to a fluid control gate having an improved seal between the gate and the wall of flexible tubing and a gate being capable of reducing the flow of fluid through a passageway by directing force in a single arcuate direction.

More specifically, the improvement relates to a first triangular plate disposed around an extender which passes through the wall of the flexible pipe to the pressurized fluid. A preformed opening existing in the extender. A second flat triangular plate corresponding in configuration to the first plate is pivotally connected to the first plate so that the second plate can be pivoted in selective adjustment over the fluid opening. A plurality of gripper fingers are uniformly spaced on the outer peripheral arc of the second plate in order to form a channel through which the edge of the first plate can travel during selective adjustment of the second plate. Furthermore, a plurality of gripper fingers are uniformly spaced along one edge of the first plate and along the opposing edge of the second plate in order to prevent or stop the pivotal directional movement of the second plate and to provide a tight water seal upon closure. A lip is provided on the second plate which bifurcates the second plate and provides a gripping point for manual adjustment of the second plate.

OBJECTS OF THE INVENTION

It is an object of this invention to provide an improved fluid control gate for use in flexible irrigation tubing.

It is a further object of the present invention to provide an improved fluid control gate which utilizes a pivotal triangular shaped plate to selectively adjust in an arcuate manner the flow of fluid through the valve.

DESCRIPTION OF THE DRAWING

FIG. 17 is a front planar view of the second triangular plate of the present invention.

FIG. 18 is a side planar view of the triangular plate of FIG. 17.

FIG. 19 is a bottom view of the triangular plate of FIG. 17.

FIG. 20 is a cross sectional view taken along lines 20—20 of FIG. 17.

FIG. 21 is a cross sectional view taken along lines 21—21 of FIG. 17 showing the details of a gripper finger of the present invention.

DETAILED SPECIFICATION

Figure 2:
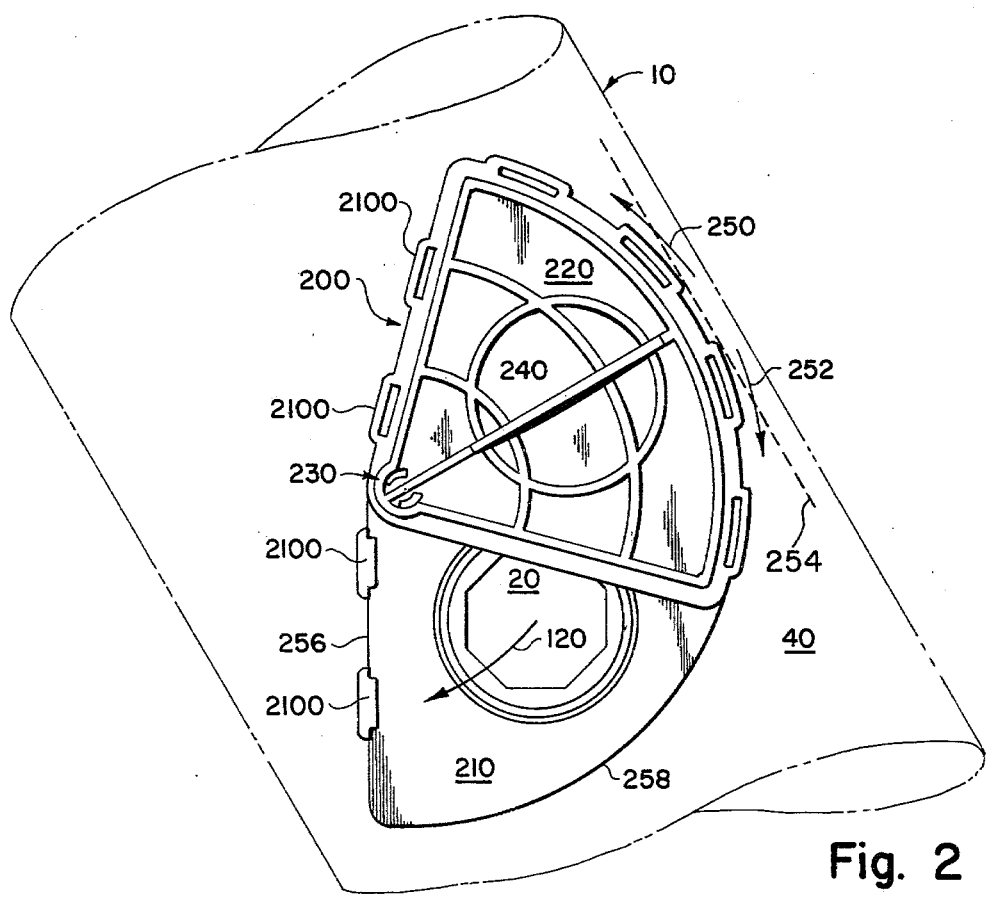
FIG. 2 is a front planar view of the improved fluid control gate of the present invention mounted in a flexible tube.

The improved fluid control gate 200 of the present invention is shown in FIG. 2 coupled to a flexible tube 10. The improved fluid control gate 200 includes a first substantially triangular plate 210 and a second substantially triangular plate 220 which is pivotally connected at point 230 to the first plate 210. By gripping the outstanding lip 240, the second plate 220 can be selectively moved in an arcuate direction as shown by arrows 250 and 252. The second valve plate 220 when moved in the direction of the arrow 250 can only be opened to a maximum position. As shown, by dotted line 254, the pivotal value plate 220 is never extended above the upper surface of the tubing 10. In this manner, throughout the entire operation in any position of the valve plate 220, there is no possibility or risk that it can be accidentally hit or caught by objects extending above the upper surface of the tubing.

By moving the valve plate 220 in the direction of arrow 252, the plate engages side 256 of the first plate 210 and is stopped from any further movement.

Figure 1:
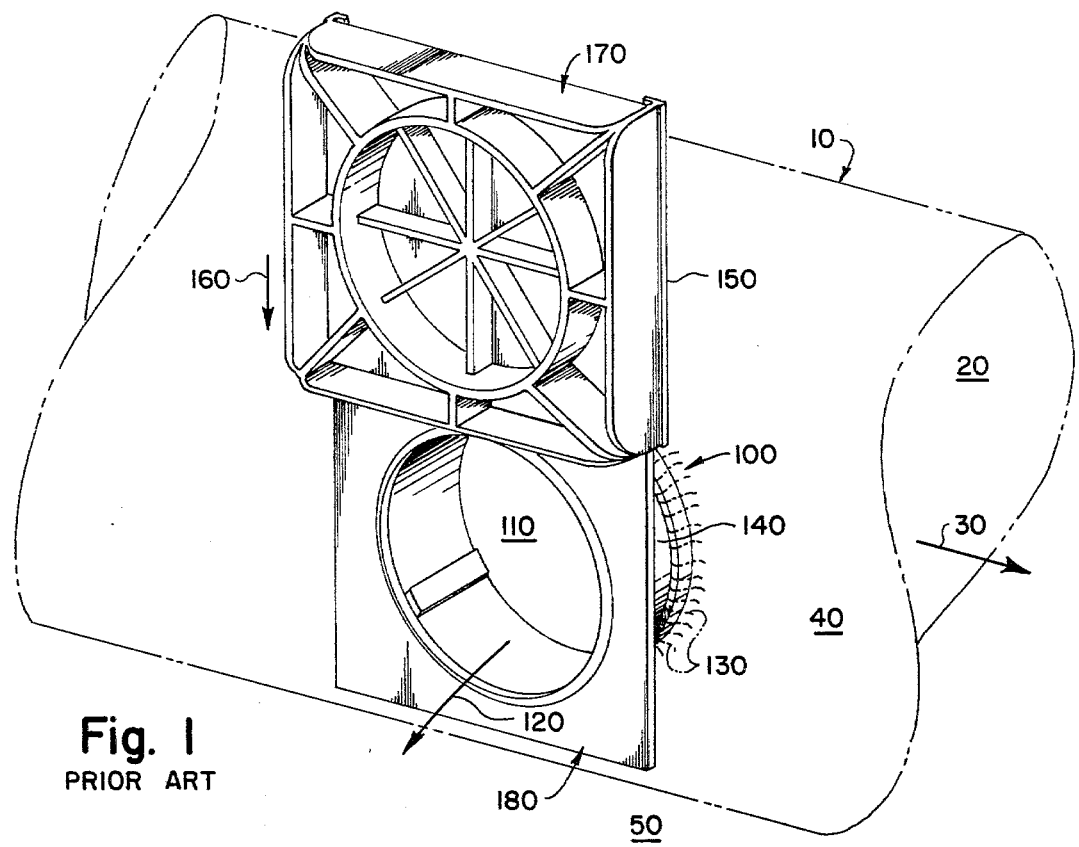
FIG. 1 is an illustration of a prior art fluid control gate mounted in a flexible tube carrying a pressurized fluid.

In comparison to the prior art device shown in FIG. 1, the valve plate 150 typically extends above the upper surface of the flexible tube 10 and in that position can be caught or struck, for example, by blown material or even the operator stepping over the tube. With the improved fluid control gate of the present invention, however, the possibility of this occurring is substantially minimized in that, as shown by line 254, the plate 220 does not extend above the surface.

Furthermore, the prior art device shown in FIG. 1 has a difficulty in moving the cover plate 150 in the direction of arrow 160. This difficulty is eliminated in the improved fluid control gate of the present invention as shown in FIG. 2 since a quick pivotal turning action at lip 240 is all that is needed. In other words, the present invention requires only an aligning force along the arcuate periphery 258 of plate 210 whereas the prior art device requires at least two vertical aligning forces on each vertical edge.

Figure 3:
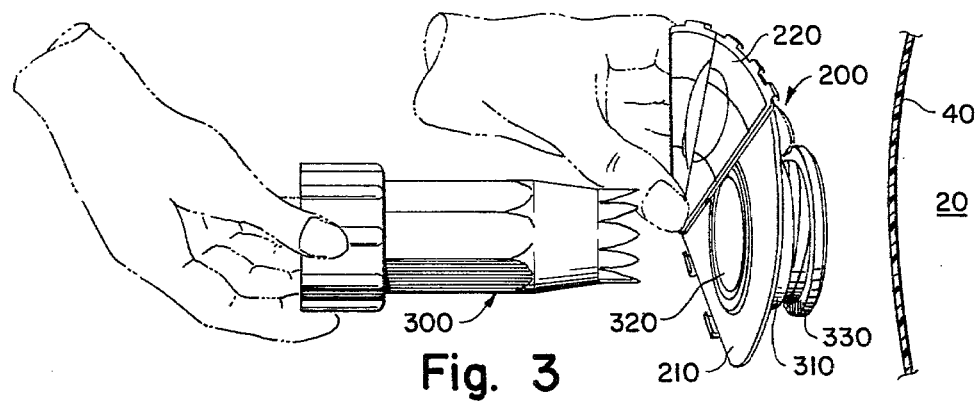
FIG. 3 is an illustration of the improved fluid control gate of the present invention and the insertion tube of the present invention.
Figure 4:
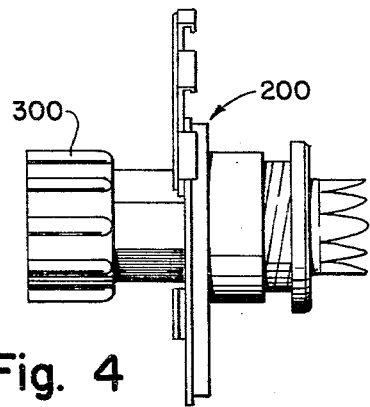
FIG. 4 illustrates the insertion of the tool into the gate of the present invention.
Figure 5:
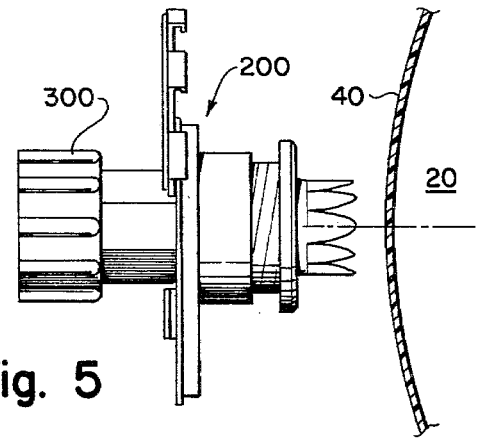
FIG. 5 is an illustration showing the alignment of the mating nut over the insertion tool.

In FIGS. 3 through 9, the method of inserting the improved fluid control gate 200 of the present invention is illustrated. In FIG. 3, an insertion tool 300 is inserted into the interior of the valve 200. Improved fluid control valve 200 includes the first substantially triangular plate 210, the second substantially triangular plate 200, a cylindrical extender 310 having an opening 320 formed therein and a mating nut 330 which threadedly engages the interior of opening 320. However, as shown in FIG. 4, the mating nut 330 is not in threaded engagement with the extender 310 for a reason to be discussed subsequently, but is pushed into an orientation abutting the interior of the extender 310. In FIG. 5, the insertion tool 300 is shown inserted into the improved fluid control gate 200 of the present invention. It is ready for insertion into the wall 40 of the tubing 10.

Figure 6:
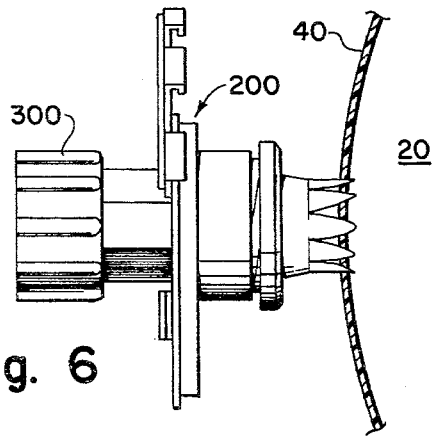
FIG. 6 is an illustration of the insertion tool penetrating into the wall of the flexible tube.
Figure 7:
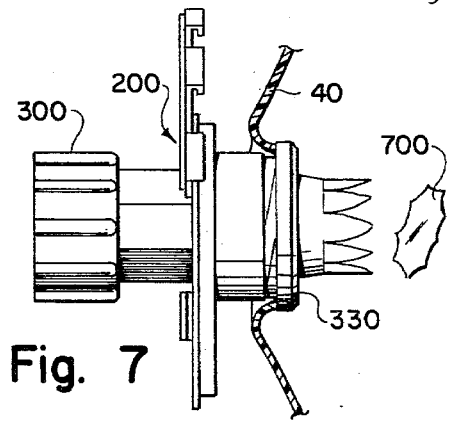
FIG. 7 is an illustration of the wall of the flexible tube engaged over the mating nut of the gate of the present invention.

As shown in FIG. 6, the insertion tool 300 commences to cut through the wall 40 of the tubing 10. At this time some of the fluid 20 as indicated squirts from the tubing 10. As shown in FIG. 7, the piece 700 from the wall 40 is cut from the wall and enters into the fluid 20. The membrane of the wall 40 is pushed up and over the outer circumference of nut 330. At this time, the flexible wall 40 is under severe stress and it immediately attempts to return toward its normal configuration. However, at this time a portion 700 has been cut out of the wall having a diameter substantially less than the diameter of the threaded portion of the mating nut 330. Therefore, the wall 40 bends inwardly towards the internal wall of the mating nut. This will be described in greater detail subsequently. Suffice it to say that the wall 40 is under extreme tension and securely hugs the circumference of the surface 710 of the mating nut 330.

Figure 8:
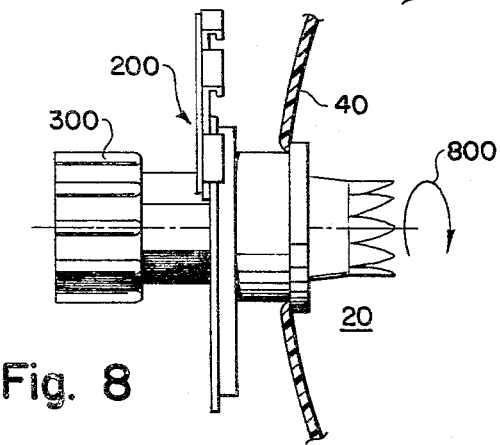
FIG. 8 is an illustration showing the tightening down of the nut into the gate of the present invention.
Figure 9:
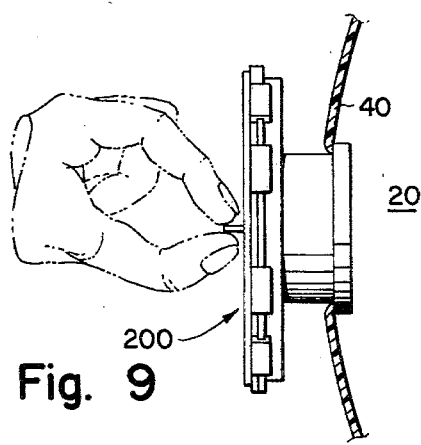
FIG. 9 is an illustration of the improved fluid control gate of the present invention firmly mounted into the wall of the flexible tubing.

In FIG. 8, the insertion tool 300 is then twisted in the direction of arrow 800 thereby causing the mating nut 330 to engage the threaded portion in the opening of the extender 310. As will be described later, the wall 40 undergoes a double S bend as it is engaged by the mating nut 330 and the extender 310. This forms an effective fluid seal as well as being capable of holding the gate 200 firmly in the tube. At this time, the insertion tool 300 can be removed and the fluid gate control of the present invention is ready for operation as shown in FIG. 9.

Figure 10:
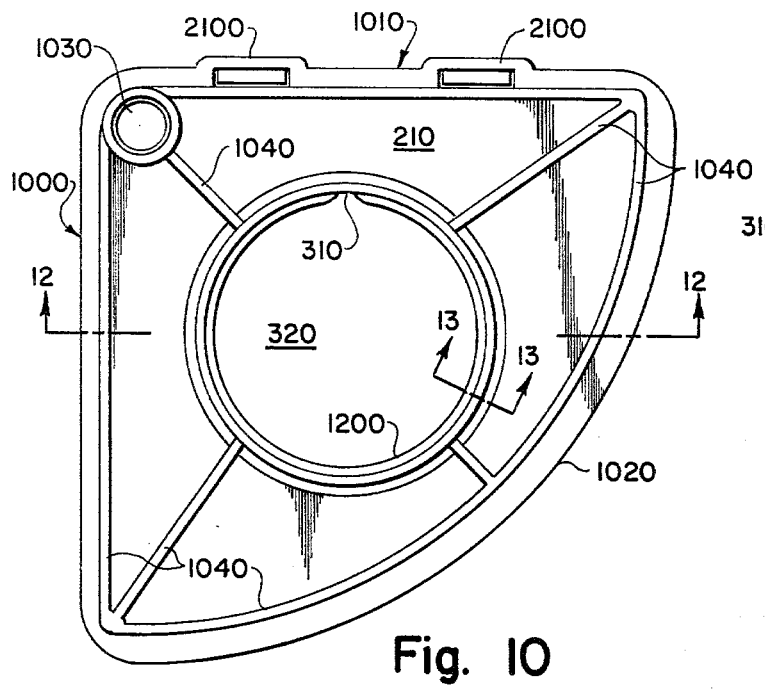
FIG. 10 is a front planar view of the first substantially triangular plate of the present invention.
Figure 11:
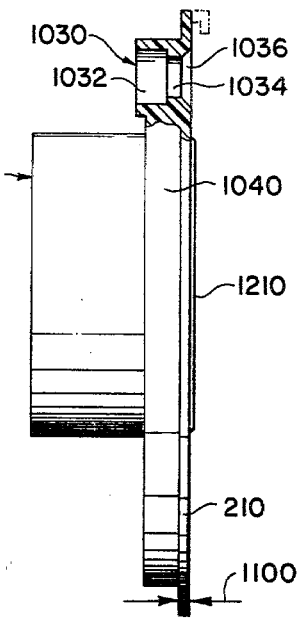
FIG. 11 is a side planar view of the plate of FIG. 10 showing the extender portion of the present invention.
Figure 12:
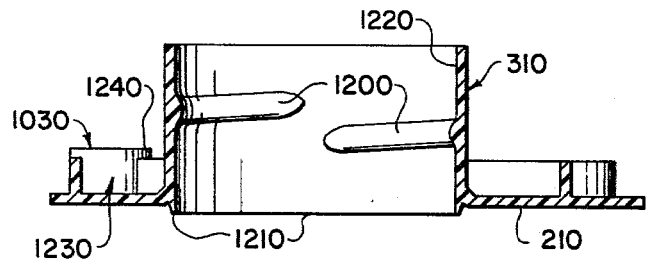
FIG. 12 is a cross section taken along lines 12—12 of FIG. 10.

The details of the first substantially triangular plate and extender are shown in FIGS. 10 and 12. The extender plate 210 is substantially triangular in configuration as shown in FIG. 10. There are two linear sides 1000 and 1010 which are perpendicular to each other. The third edge 1020 is arcuate in shape having a radius substantially corresponding to the length of either edge 1000 or 1010. As can be seen in FIG. 10, the three corners of plate 210 are rounded. The apex between edges 1000 and 1010 contains a circular pivot cup or cavity 1030. Upstanding ribs 1040 are provided for structural strength for the plate 210. A cylindrically shaped extender 310 is integral with the plate 210 and is vertically upstanding as shown in FIG. 11 thereto. A formed opening 320 extends through the extender 310. The opening 320 extends through the extender 310 and the triangular plate 210.

As shown in FIG. 12, on the interior of the extender 310 is an upstanding formed single thread 1200 which is substantially oriented in the center of the extender 310.

Figure 13:
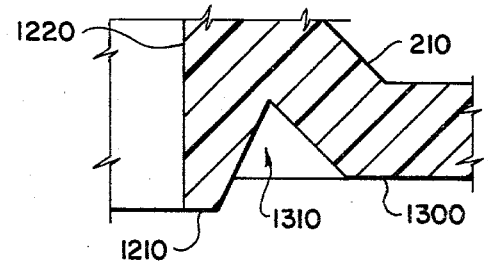
FIG. 13 is a partial cross section taken along lines 13—13 of FIG. 10.

As can be seen in FIG. 11, the side of the triangular plate 210 opposite the extender 310 is uniformly flat, but for an upstanding lip 1210. This lip, as shown in FIG. 12, corresponds in diameter to the diameter of the opening 320. The detail of this lip is shown in FIG. 13. The flat surface 1300 of plate 210 forms a V shaped annular cavity 1310. The cavity terminates in lip 1210 which is a raised ridge extending above the flat surface 1300 of plate 210. Lip 1210 then terminates in the perpendicular wall 1220 which forms the cylindrical side walls of the opening 320. The lip 1210 is highly flexible, and as will be discussed later, cooperates with the second triangular plate 220 to form a water tight seal between the two plates.

Before leaving FIGS. 10–13, the configuration and shape of the pivot cup 1030 will be presented. As shown in FIG. 12, the cup 1030 comprises a second cylindrical region 1230 which terminates against plate 210 on one end and on the opposing end terminates at the opposing end in an integral ring 1240. This opening 1030 has a first cylindrical portion 1032 terminating in a second cylindrical portion having a smaller diameter than the first cylindrical portion, the second cylindrical portion 1034 terminates in an outwardly extending tapered region 1036. This is best shown in FIG. 11.

Figure 14:
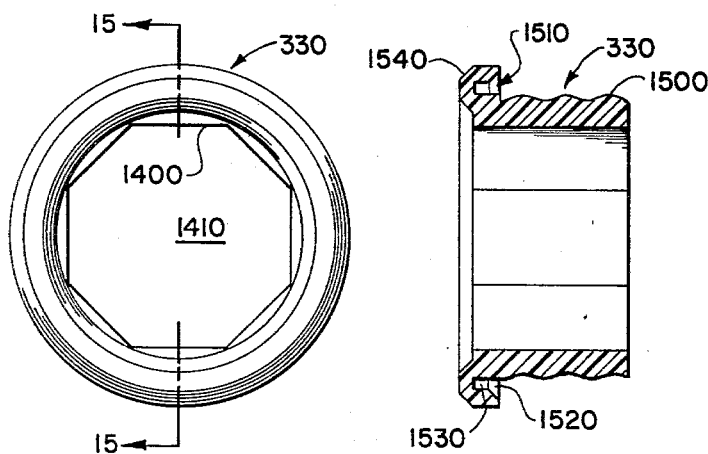
FIG. 14 is a front planar view of the mating nut of the present invention.
Figure 15:
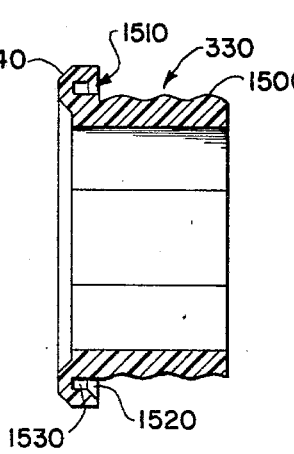
FIG. 15 is a cross sectional view taken along lines 15—15 of FIG. 14.
Figure 16:
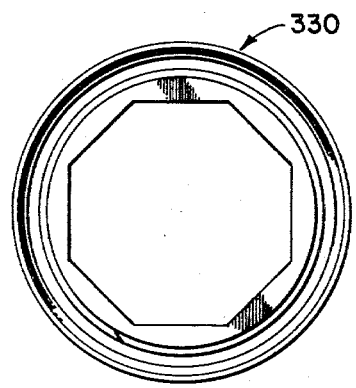
FIG. 16 is a rear planar view of the mating nut of the present invention.

The details of the mating nut 330 are shown in FIGS. 14 through 16. As shown in FIGS. 14 and 16, the interior of the mating nut 330 forms an octagon shape which corresponds to a configuration slightly greater than the octagon shape of the main body portion of the insertion tool 300 shown in FIG. 3. The opening defined by the octagonal shape 1400 is termed 1410 and forms the passageway through which the fluid flows on the selective operation of the improved fluid control gate of the present invention. The prior art approach shown in FIG. 1 has only a single raised key for turning the mating nut which can be physically cracked upon repeated use of the control valve. This problem is eliminated under the above teachings of the present invention through use of the octagon or poly-sided shape.

The outer periphery of the mating nut 330 is cylindrically shaped and contains a plurality of threads 1500 as best shown in FIG. 15. These threads are designed to engage the upstanding single thread 1200 on the interior of the extender 310 as shown in FIG. 12.

The mating nut 330, as shown in FIG. 15, also has a reset annular cavity 1510 which contains a tapered annular region 1520 and a cylindrically shaped annular region 1530. As shown in FIG. 8, this region 1510 cooperates with the wall 40 and the extender 310 to form a water tight seal as will be more thoroughly discussed later. The upper surface 1540 of the mating nut 330 is tapered in order to allow the wall of the mating nut 330 to slideably engage each other upon insertion as shown in FIG. 7. The taper provided by region 1520 shown in FIG. 5 is important to prevent cutting or tearing of the wall 40 after insertion and during use as will be discussed subsequently.

In FIGS. 17 through 21 the details of the second substantially triangular plate 220 are shown. In FIG. 17, the exterior side of plate 220 is shown to include two linear perpendicular edges 1700 and 1710. At the point of intersection, an apex is formed which corresponds to the apex point 230 as shown in FIG. 2. A third arcuate edge 1720 is formed between the linear edges 1700 and 1710 and has a radius corresponding to the length of either edge 1700 or 1710 from the apex point. A large number of support ribs 1730 are provided to provide structural strength to the plate 220. These ribs are upstanding as best shown by reference to FIG. 18.

The center rib 1740 contains an upstanding lip 1750 in the shape of a half-moon as shown in FIG. 20. In reference back to FIG. 9, the lip 1750 can be manually gripped to move plate 220 with respect to plate 210.

Plate 220 is affixed to plate 210 by means of a friction lock 1760. Friction lock 1760 is an upstanding split post which is capable of flexing inwardly as it is pushed into cup 1030 and then once fully inserted snaps out to engage the shoulder between regions 1032 and 1034 as shown in FIG. 11. Once the friction lock 1760 is inserted, it is difficult to remove plate 220 from plate 210.

Disposed along edges 1700 and 1720 are a plurality of gripper fingers 2100. A cross section of a typical gripper finger 2100 is shown in FIG. 21 to include a channel 2110 formed from a vertical upstanding ridge 2120 from the plate 220 and an inwardly directed lip 2130 which has one surface 2140 perpendicular to the outer surface 2150 of ridge 2120 and an inner surface 2160 which is slightly tapered upwardly as shown in FIG. 21. An open slot 2170 is formed in plate 2120 extending substantially the length of the upper lip 2130 as best shown in FIGS. 17 and 19. The width of the channel 2110 is designated by arrow 2180 and is slightly greater than the thickness of the plate 210 as shown in FIG. 11 and designated by arrows 1100. The purpose of the slot 2170 is to reduce the friction encountered as the plate 220 slideably engages plate 210. In other words, as the peripheral edge 1020 of plate 210 slideably engages the channel 2110, the provision of slot 2170 reduces the engagement friction there-between. Furthermore, the provision of a tapered surface 2160 substantially permits plate 220 to slideably engage plate 210 without binding as the peripheral edge 1020 engages each successive gripper finger 2100 as plate 220 is pivoted.

It is important to refer back to FIG. 11 and the provision of the upstanding lip 1210. When plate 220 is fully opened and then is pivoted in the direction of closing the passageway 1410, it engages lip 1210. When this occurs, the peripheral edge 1020 abuts surface 2160 of lip 2130 under tension and lip 2130 may actually move outwardly in the direction of arrow 2190 slightly. This causes the engagement lip 1210 to firmly abut the flat surface 1900 of plate 220 to form a water tight seal in that surface 1210 will frictionally and firmly engage surface 1900.

A plurality of gripper fingers 2100 are also provided on plate 210 as best shown by reference backed FIGS. 10 and 11. It can be appreciated by reference to FIG. 2, that when plate 220 is fully closed over plate 210, the gripper fingers 2100 on plate 210 are gripping in opposing directions. Furthermore, in the fully closed position all sides of plates 220 and 210 are firmly engaged with each other to provide a tight water seal between surface 1900 and surface 1210. It will be appreciated in the Blumhardt device that at least two surfaces, the upper surface 170 and the lower surface 180 are not in engagement and the possibility of leaking along these two edges is substantially increased.

In addition the grippers 210 located on plate 210 serve a valuable function, in that when the plate 220 is fully closed over plate 210, linear edge 1710 of plate 220 engages the tapered inner surface 2160 (of lip 2130) of the grippers and the entire plate 220 is biased against the seal 1210 to provide a very secure water seal.

Figure 22:
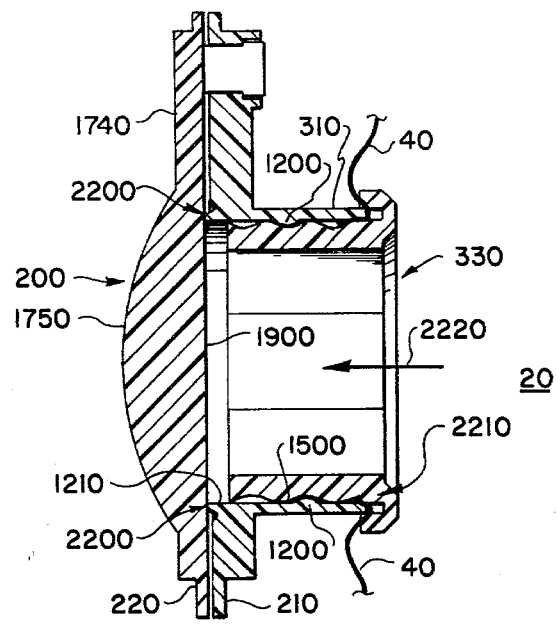
FIG. 22 is a cross sectional view of the improved fluid control gate of the present invention.

In FIG. 22, the cross section of the valve mounted to wall 40 is shown with plate 220 fully closed over plate 210. The priorly discussed fluid seal 2200 is provided between plates 210 and 220 by the abutting of surface 1210 against surface 1900. Furthermore, as shown in FIG. 22, the wall 40 around the periphery of the extender surface 1200 is thoroughly immeshed between the mating nut 330 and the extender 1200. The extent of engagement is at least over one of the threads 1500. This forms a tight water seal 2210 between the wall 40 and the improved fluid control gate 200 of the present invention. In this closed position, the fluid 20 is exerting a pressure in the direction of arrow 2220. There is a tendency of the gate 200 to be pushed out from the wall 40 under varying and at times considerable force. Due to the substantial engagement of the wall 40, the mating nut 330 and the extender 1200 undergo at least two S bends, in a perpendicular relationship. The gate 200 is firmly held to the wall 40 despite the forces in the direction of arrow 2220. As priorly discussed, plate 220 is firmly held against plate 210 by means of gripper fingers located at predetermined spaces on the periphery of all sides of the two plates. Again, a tight water seal is maintained in the area of 2200 between the two plates 210 and 220.

Figure 23:
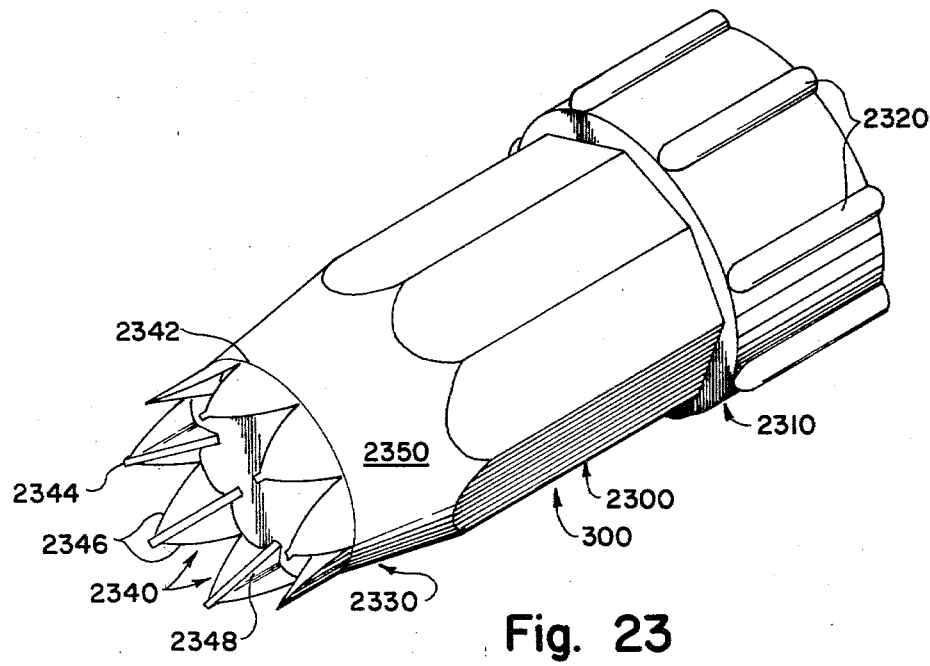
FIG. 23 is a perspective illustration of the insertion tool of the present invention.

In FIG. 23 is shown a perspective of the insertion tool of the present invention. This insertion tool is made from plastic and includes a main shaft portion 2300 which is octagonal in shape and is slightly less in dimension than surface 1400 of the mating nut 300 shown in FIG. 14. Connected on one end and integral therewith to the main body portion 2300 is a cylindrically shaped gripping portion 2310 having a plurality of ridges 2320. The gripping end 2310 is designed to fit primarily in the palm of a hand and the ridges 2320 provide a sufficient surface for the fingers of the hand to conveniently grip. At the opposing end of the main body portion 2300 is the insertion end 2330 which terminates in a plurality of upstanding slicers 2340. The slicers 2340 are oriented around a circumferential edge 2342. The slicers are radially disposed from this edge 2342 in an outwardly extending fashion so that the pointed edges 2344 of each slicer 2340 are oriented in a circular peripheral plane of greater diameter than the diameter of the peripheral edge 2342. Each slicer comprises the punching or incisive edge 2344 quickly terminating into opposing side slicers 2346. Perpendicular support posts 2348 are provided for each slicer 2340 to prevent bending or breaking of an individual slicer 2340.

In operation, and with reference back to FIGS. 3 through 9, the incisive edge 2344 pierces into the wall 40 and then with additional force on the tool 300, the wall 40 is sliced by slicers 2346. Upon insertion and slicing, the wall 40 firmly abuts under tension against surface 2342 of the tool. Then with continued insertion of the tool the wall 40 undergoes expansion on tapered surface 2350 of the tool 30 and then is expanded over the mating nut 330. It is apparent that a single insertion tool 300 can be utilized to insert a large number of the improved fluid control gate 200 of the present invention into tubing.

Although the present invention has been described with a certain degree of particularity, it is understood that the present disclosure has been made by way of example and that changes and detail of structure may be made without departing from the spirit thereof.

We claim:

1. An improved fluid control gate for selective insertion through a flexible wall, said wall having a first side in contact with a fluid and a second opposing side in contact with an environment of lower pressure than the pressure of said fluid, said gate having means extending through said wall, said extending means having a formed opening therethrough, means for firmly mating into said formed opening on the fluid side of said extending means, said mating means when fully inserted into said opening being capable of causing the periphery of said wall near said formed opening to firmly abut between said extending means and said mating means to form a fluid seal, said mating means having a formed passageway therethrough, and means cooperative with said extending means for selectively reducing the flow of said fluid through said passageway from a predetermined maximum rate to no flow, the improvement to said reducing means comprising:

a first substantially flat triangular plate outwardly extending around the periphery of the end of said opening of said extending means near said second side of said wall, said first plate having a hole formed therethrough corresponding in size and aligned with said opening, said first plate being oriented substantially parallel to said wall, a second substantially flat triangular plate corresponding in configuration to said first plate, said second plate being pivotally connected to said first plate at aligning apex corners of said plates, the peripheral edges of said first and second plates opposite said apex being formed in the shape of an arc having its radius determined in a linear line from said apex, a fluid seal disposed around the periphery of said hole on said first plate, and means cooperative with said arcuate peripheral edges for firmly holding said second plate in pivotal engagement against said fluid seal on said first plate.

2. The improved gate of claim 1 further comprising means on said second plate for gripping so that said second plate can be manually pivoted about said apex to control the amount of fluid flowing through said passageway.

3. The improved gate of claim 1 further comprising means disposed on said first plate to limit the pivotal travel of said second plate to less than 180 degrees.

4. The improved gate of claim 1 wherein said holding means comprises one or a plurality of gripper fingers disposed on the outer peripheral arc edge of said second plate, each of said gripper fingers forming a channel through which the peripheral arc edge of said first plate travels as said second plate is pivoted, the width of said channel being slightly greater than the width of said peripheral arc edge of said first plate, said channels being oriented to bias said peripheral arc edge of said second plate firmly against said fluid seal on said first plate.

5. The improved gate of claim 4 wherein said holding means further comprises one or a plurality of gripper fingers disposed on a linear edge of said first plate, said linear edge being oriented between said apex and said peripheral arc edge of said first plate, each of said gripper fingers forming a channel through which the corresponding linear edge of said second plate engages as said second plate is pivoted into the aforesaid gripper fingers, the width of the aforesaid channels being slightly greater than the width of said peripheral arc edge of said second plate, the aforesaid channels being oriented to bias said peripheral edge of said second plate firmly against said fluid seal.

6. The improved gate of claim 5 wherein said holding means further comprises one or a plurality of gripper fingers disposed on a linear edge of said second plate, said linear edge being oriented opposite said grippers on said linear edge of said first plate, each of said gripper fingers forming a channel through which the corresponding linear edge of said first plate engages as said second plate is pivoted into the aforesaid gripper fingers.

7. The improved gate of claim 1 wherein said gripper means comprises an outwardly extending lip affixed on the outer surface of said second plate, said lip being oriented along that radius for the peripheral arc edge which bifurcates the second plate into equal parts.

8. An improved fluid control gate for selective insertion through a flexible wall, said wall having a first side in contact with a fluid and a second opposing side in contact with an environment of lower pressure than the pressure of said fluid, said gate having means extending through said wall, said extending means being substantially cylindrical in shape and having a formed opening therethrough, means for firmly mating into said formed opening on the fluid side of said extending means, said mating means when fully inserted into said opening being capable of causing the periphery of said wall near said formed opening to firmly abut between said extending means and said mating means to form a fluid seal, said mating means having a formed passageway therethrough, and means cooperative with said extending means for selectively reducing the flow of said fluid through said passageway from a predetermined maximum rate to no flow, the improvement to said reducing means comprising:
- a first substantially flat triangular plate outwardly extending around the periphery of the end of said opening of said extending means near said second side of said wall, said first plate having a hole formed therethrough corresponding in size and aligned with said opening, said first plate being oriented substantially parallel to said wall,
- a second substantially flat triangular plate corresponding in configuration to said first plate, said second plate being pivotally connected to said first plate at aligning appex corners of said first and second plates, the peripheral edges of said first and second plates opposite said apex being formed in the shape of an arc having its radius determined in a linear line from said apex,
- a fluid seal disposed around the periphery of said hole on said first plate,
- a first plurality of gripper fingers uniformly spaced on the outer peripheral arc edge of said second plate, each of said gripper fingers forming a channel through which the peripheral arc edge of said first plate travels as said second plate is pivoted, the width of said second channel being slightly greater than the width of said peripheral arc edge of said first plate, said channels being oriented to bias said peripheral arc edge of said second plate firmly against said fluid seal on said first plate,
- a second plurality of gripper fingers uniformly spaced on a linear edge of said first plate, said linear edge being oriented between said apex and said peripheral arc edge of said first plate, each of said gripper fingers forming a channel through which the corresponding linear edge of said second plate engages as said second plate is pivoted into the aforesaid gripper fingers,
- a third plurality of gripper fingers uniformly spaced on a linear edge of said first plate, the aforesaid linear edge being oriented between said apex and said peripheral arc edge of said second plate, each of said gripper fingers forming a channel through which the corresponding linear edge of said first plate engages as said second plate is pivoted into the aforesaid gripper fingers and
- an outwardly extending lip affixed on the outer surface of said second plate, said lip being oriented along that radius for the peripheral arc edge which bifurcates the second plate into two equal parts.

* * * * *